United States Patent [19]

Rougerie

[11] 4,423,695
[45] Jan. 3, 1984

[54] FLOATABLE AND UNSINKABLE NAUTICAL CRAFT

[75] Inventor: Jacques Rougerie, Paris, France

[73] Assignee: Oceanova, Paris, France

[21] Appl. No.: 175,884

[22] Filed: Aug. 6, 1980

[30] Foreign Application Priority Data

Aug. 7, 1979 [FR] France .................. 79 20156

[51] Int. Cl.³ .............................. B63B 35/72
[52] U.S. Cl. ........................ 114/61; 114/56; 114/66; 114/125
[58] Field of Search ............. 114/61, 66, 123, 125, 114/140, 283, 290, 270, 313, 333, 56, 173

[56] References Cited

U.S. PATENT DOCUMENTS

| D. 124,128 | 12/1940 | Greene | 114/66 |
|---|---|---|---|
| 385,656 | 7/1888 | Belisle | 114/66 |
| 3,019,754 | 2/1962 | Welshausen | 114/68 |
| 3,094,959 | 6/1963 | Fox | 114/140 |
| 3,254,621 | 6/1966 | White | 114/66 |
| 3,680,515 | 8/1972 | Yoneda et al. | 114/66 |
| 3,688,720 | 9/1972 | Lok | 114/333 |

FOREIGN PATENT DOCUMENTS

| 450837 | 4/1913 | France | 114/66 |
|---|---|---|---|
| 2008515 | 6/1979 | United Kingdom | 114/125 |

OTHER PUBLICATIONS

Whitney, Parts and Accessories, Catalog 354B, 1976, p. 15.

Primary Examiner—Trygve M. Blix
Assistant Examiner—Stephen P. Avila
Attorney, Agent, or Firm—Robert E. Burns; Emmanuel J. Lobato; Bruce L. Adams

[57] ABSTRACT

A floating unsinkable nautical craft comprises a hull having a keel portion below the water line and an upper portion. A longitudinally extending passenger compartment is provided at least mostly in the keel portion while a pilot's cockpit and passenger entrance are provided in the upper portion. Longitudinally extending dome-shaped observation windows are provided in the sides of the passenger compartment, the windows being of such length and height as to provide several passengers with an underwater view horizontally and downwards. A separate stabilization and bouyancy structure is connected rigidly to the upper portion of the hull and extends laterally to both sides with flotation and water ballast chambers at the ends. A pump is provided for varying the ballast to vary the draught of the craft.

13 Claims, 4 Drawing Figures

FLOATABLE AND UNSINKABLE NAUTICAL CRAFT

FIELD OF INVENTION

The present invention relates to a floating and unsinkable nautical craft in particular constituting a station for observing the under-water environment whilst the observer remains dry, in particular a semisubmersible and self-propelled craft.

BACKGROUND OF INVENTION

Nautical craft are already known whereof the aim is to observe the under-water environment for working or diving reasons. These known craft belong essentially to one of the two following types: boats having a transparent bottom on the one hand and submarine craft on the other hand.

Known boats having a transparent bottom are generally developments of flat-bottom boats intended for tourism. Consequently, these flat-bottomed boats are not specifically designed for observing the under-water environment. Thus the vision is essentially downwards in a vertical direction and therefore unnatural, very limited and of poor quality. Furthermore and this is essential, the observer remains so to speak outside the under-water environment which considerably limits interest in these craft of which the only advantage is their relative simplicity.

On the other hand, the known submarine craft is generally specifically designed for being completely submerged under normal conditions, it follows that sophisticated sealing, ventilation safety devices etc., are required. Although the use of such a craft enables the passengers to be truly integrated in the underwater environment, the necessity for the sophisticated devices and the absence of permanent and true communication between the passenger compartment and the outside atmosphere makes this craft ill-suited for under-water tourism. Furthermore, a craft of this type is expensive and to a certain extent is frequently superfluous in view of the fact that the particularly interesting areas to be observed from an instructional or aesthetic point of view are frequently shallow areas and do not require total immersion of the craft.

On the other hand, floating, unsinkable nautical craft are known such as large tonnage ships, whereof the submerged part or hull is considerable and may comprise observation port-holes. However, the essential function of this submerged part is to ensure the stability of the craft and not to allow internal life which renders a craft of this type ill-suited for under-water tourism. Furthermore, a craft of this type is unable to gain access to areas of shallow water, which are most frequently the areas having instructional or aesthetic interest.

SUMMARY OF THE INVENTION

Thus, the present invention intends to remedy these drawbacks and to this end it proposes a floating, unsinkable nautical craft which comprises in combination a hull having a keel portion and an upper portion with a compartment for passengers provided at least partially in the keel portion and a pilot's station and access means for passengers in the upper portion of the hull. Separate stabilization and bouyancy means is rigidly connected to the upper portion of the hull and projects laterally from both longitudinal sides of the hull. The passenger compartment is provided with at least one longitudinally extending observation window in a longitudinal side of the hull, such observation window being dome-shaped and defining a laterally projecting part of the keel portion of the hull. The window is of such longitudinal and vertical extent that several passengers can have an under-water view through the dome-shaped window in a horizontal direction and in a downward direction.

According to another feature of the invention the nautical craft is semi-submersible and also comprises, in combination, means for varying the draught and facilitating its movement between two water lines, one being a lower line and the other an upper line where the observation port-holes are substantially submerged.

According to another feature of the invention, which can be combined with the former, the craft is self-propelled and comprises, in combination, propulsion means located at the rear and a station for steering the craft comprising means for seeing on the surface and means for seeing under-water.

By way of example, a craft of this type is able to carry a group of between 6 to 10 passengers or even more so that they are truly completely integrated in the under-water environment under complete conditions of comfort and material and psychological safety. Finally, the special features of the craft according to the invention are such that the field of observation is very wide and the quality of vision is exceptional.

BRIEF DESCRIPTION OF THE DRAWINGS

The other features of the invention will be better understood on reading the ensuing description of a particular possible and non-limiting embodiment, with reference to the accompanying drawings in which.

DESCRIPTION OF PREFERRED EMBODIMENT

Figure 1:
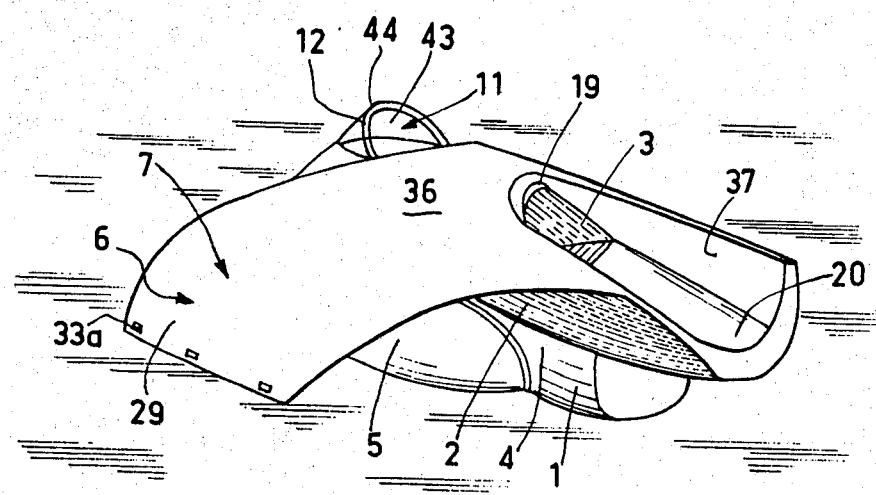
FIG. 1 is a diagrammatic view, in perspective, from the outside atmosphere, of one possible particular embodiment of a craft according to the invention, floating at its lower water line.
Figure 2:
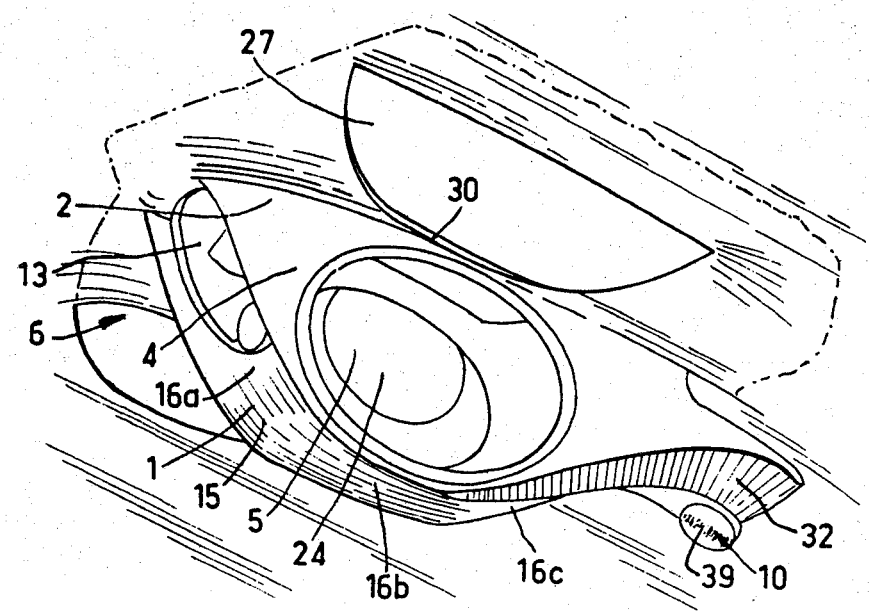
FIG. 2 is a diagrammatic view, in perspective, from the under-water environment, of the craft illustrated in FIG. 1, floating at its upper water line.

The invention proposes a floating, unsinkable nautical craft, which comprises, in combination, a rigid hull 1 having a keel portion below the water line and an upper portion 2 above the water line. A compartment intended for accommodating passengers is located at least primarily in the keel portion while passenger access means is provided in its upper part 2 which is normally in permanent communication with the atmosphere. The keel, in particular at least one longitudinal side 4, is provided with at least one observation window 5 and stabilisation and buoyancy means 6 which are separated structurally and functionally from the hull 1, but associated rigidly therewith, in particular with its upper part 2, are located laterally and spaced apart on either side of the latter, leaving the field of observation through the windows 5 substantially free both horizontally and downwards.

According to an essential and preferred, but nonexclusive and non-limiting embodiment, the craft is semisubmersible and also comprises, in combination, means 7 for continuous dynamic ballasting, i.e. for varying the draught and facilitating any manoeuvre or desired position of the craft between two extreme waterlines, a lower line 8, and an upper line 9 where the observation windows 5 are substantially submerged.

Also, according to a preferred but non-exclusive and non-limiting embodiment, the craft according to the invention is self-propelled and comprises propulsion means 10 located essentially at the rear of the craft and a station 11 for steering the craft comprising means 12 for surface vision and means 13 for under-water vision.

A possible and preferred embodiment of the invention will now be described in the case where the craft is self-propelled and comprises means 7 for varying the draught, which embodiment is in no way limiting.

In this particular embodiment, the craft has a longitudinal and vertical main plane of symmetry. The hull 1 has a general egg-shaped or pseudo egg-shaped shape, which is enlarged in its upper part, whereof the major axis 14 is located horizontally or at least substantially horizontally.

The hull 1 comprises a high resistance structure 15 having a central enclosure comprising a front section 16a, a lower section 16b, a rear section 16c and an upper section 16d, each in the general form of a flat or pseudo flat or slightly concave strip. The front section 16a is inclined upwards and forwards for example at approximately 45°. The lower section 16b and the upper section 16d are placed at least substantially horizontally. The rear section 16c is inclined upwards and rearwards in its entirety.

Figure 4:
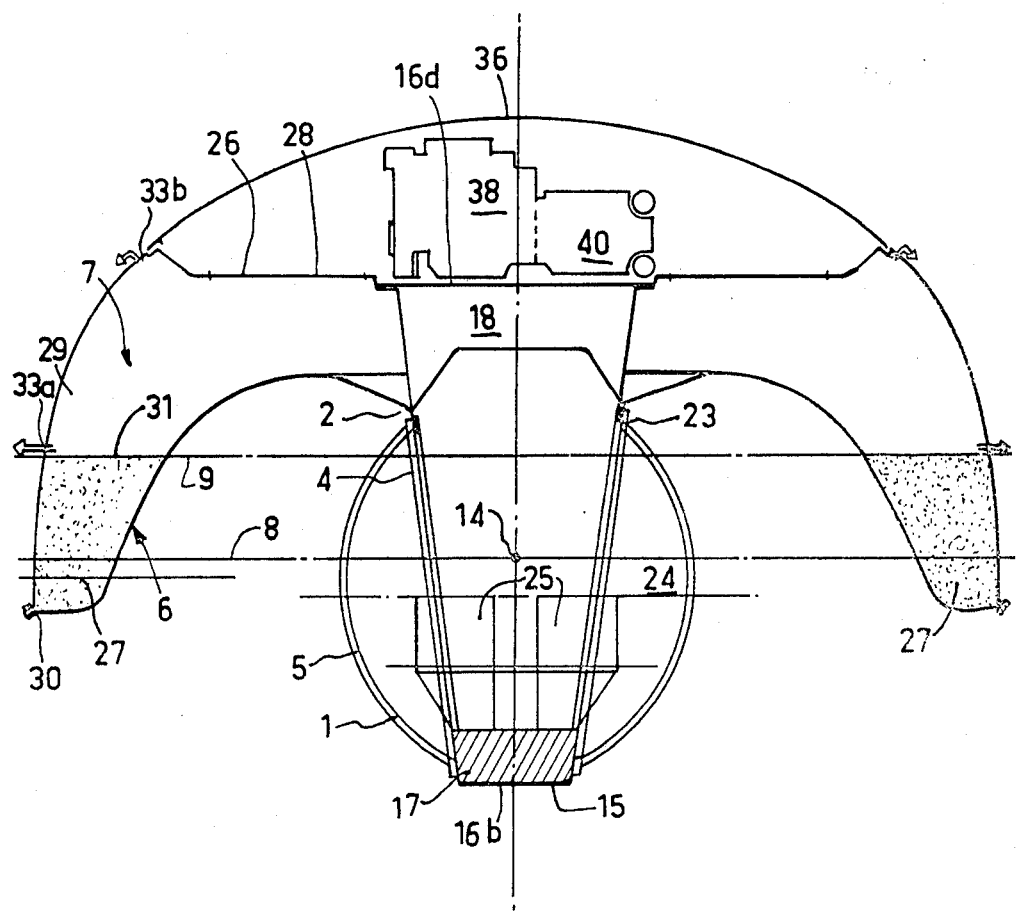
FIG. 4 is a diagrammatic sectional view through a vertical transverse plane on line IV—IV of FIG. 3.

The high resistance structure 15 also comprises two longitudinal sides 4, each of substantialy flat, pseudo flat or concave general shape, in particular with the concave side directed towards the longitudinal plane of symmetry of the craft. Preferably, each side 4 is inclined upwards and towards the outside of the craft so that the two sides 4 diverge in an upwards direction as illustrated in FIG. 4. This particular arrangement is advantageous in particular for reasons of solidity of the craft, for passenger comfort, quality of vision, stability, ease of access and ventilation.

The lower section 16b of the central enclosure serves as a support for a suitable lead ballast 17. The upper section 16d and possibly the lower section 16b may define service passageways 18 for the passage of any conduit, pipe, connection, wire etc.

The access means 3 comprise an opening 19 provided in the enclosure of the structure 15 in particular in the rear part of the upper section 16d. This opening is preferably inclined upwards and forwards. The access means also comprise an access platform 20 of substantially flat or slightly concave general shape, located opposite the opening 19, located in the median longitudinal plane of symmetry of the craft, directed towards the rear of the latter and located in a plane corresponding to or close to that of the upper section 16d. This platform 20 is thus located at least partly in line with the rear section 16c.

Finally, the access means 3 comprise a staircase or inner gangway 21 extending between the opening 19 and the floor 22 of the hull 1 located above the ballast 17. This staircase or gangway 21 is preferably inclined upwards and rearwards.

In the embodiment illustrated in the drawings, each of the two longitudinal sides 4 comprise a single and central observation window 5 occupying a substantial part of the side 4 and intended for all the passengers of the craft. This window extends between the front section 16a, the lower section 16b, in line with the staircase or gangway 21 and upwards and is at a distance from the upper section 16d.

According to one feature of the invention, each window 5 is in the form of a dome, whereof the concave side faces the inside of the craft, having a general shape of an ellipsoidal or pseudo ellipsoidal dome of revolution or substantially of revolution, whereof the axis of revolution is horizontal and parallel to the longitudinal median plane of symmetry of the craft. The peripheral edge 23 of this dome which is associated rigidly and in a water-tight manner with the edge of the corresponding opening provided in the longitudinal side 4 has a general ellipsoidal or pseudo ellipsoidal shape, whereof the major axis is horizontal or substantially horizontal.

This particular arrangement combined with the divergent nature of the sides 4 ensure both rigidity and therefore great safety, suitability for habitation and considerable comfort, a very wide field of observation and excellent quality of observation. Furthermore, this particular shape gives the passengers the surprising illusion of being completely surrounded by the underwater environment which also increases the interest of the craft.

The hull 1 thus defines a passenger compartment 24 comprising seats 25 and other devices, means or arrangements for the comfort of the passengers.

As will be understood, the passenger compartment 24 is located at a lower level than that of the access platform 20, which is normally out of the water.

In a particular embodiment, the dome-shaped windows 5 are made from blown metacrylate, which makes it possible to achieve considerable dimensions, for example of the order of 1 or more meters as regards the main axis of the ellipse.

Figure 3:
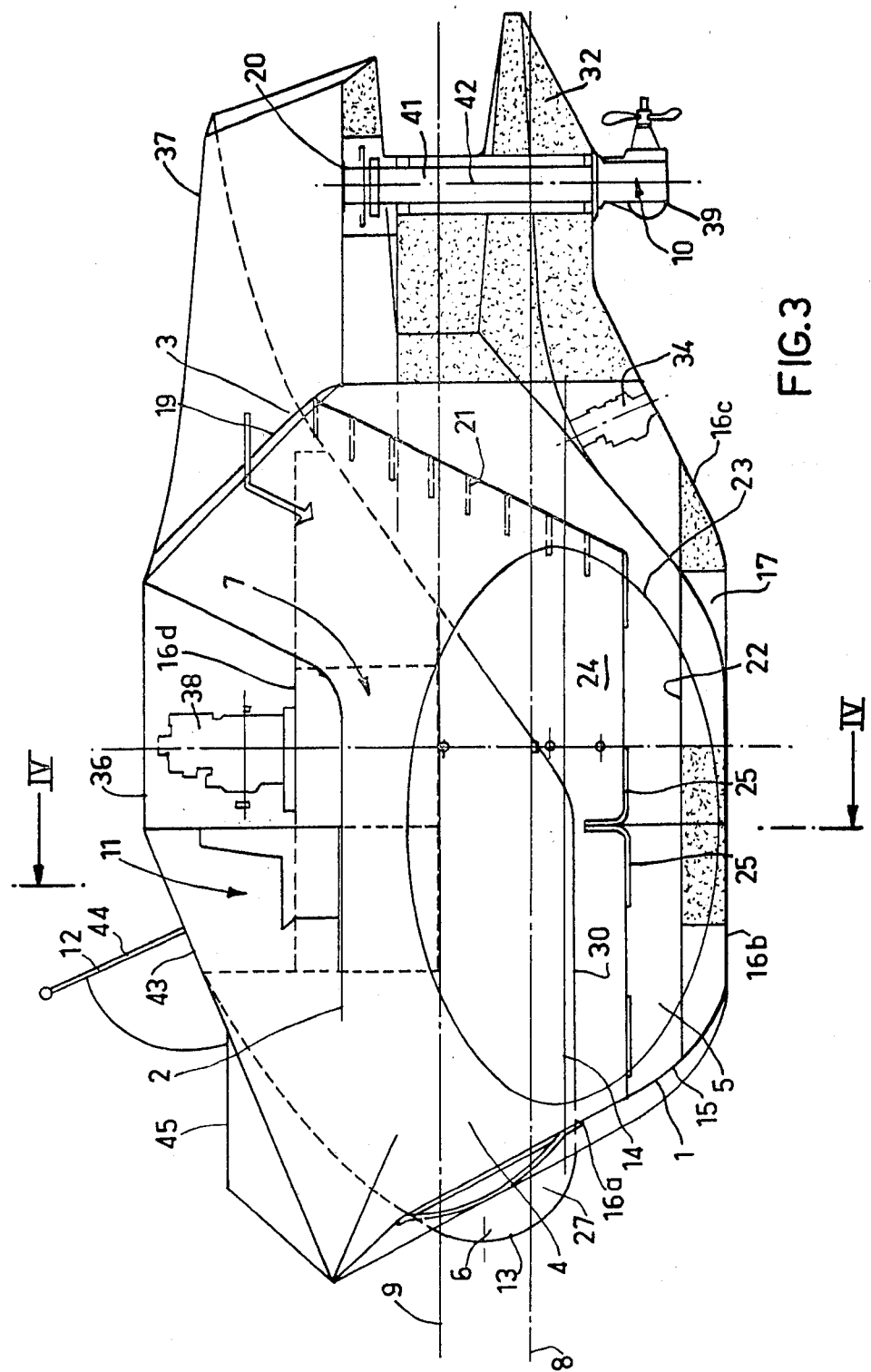
FIG. 3 is a diagrammatic sectional view through a longitudinal and vertical plane of the craft illustrated in FIGS. 1 and 2.

Preferably, the seats 25 are arranged longitudinally and in pairs one opposite the other as illustrated in FIG. 3.

According to the particular embodiment of the invention illustrated in the drawings, the stabilisation and buoyancy means 6 are of the catamaran type connected rigidly to the hull 1 in its upper part 2, in particular to the upper section 16d of the enclosure and to the upper part of the sides 4. This particular embodiment not only makes it possible to ensure the stabilisation and buoyancy function very correctly, for which these means are specifically intended, but also makes it possible to fulfil a double specific function, namely firstly protecting the windows—done 5—, either in the course of navigation or when in port. This protection is rendered more effective during navigation owing to the fact that the stabilisation and buoyancy means 6 are offset towards the front of the craft and project from the front section 16a of the high resistance enclosure. In the second place, the stabilisation and buoyancy means 6 increase the quality of observation from the craft, by locating the passengers in their own light, in view of the fact that the passengers are not disturbed by light rays coming down directly from the surface, which are prevented by the means 6.

Finally and in the particular case where the craft comprises means for varying the draught, the means 6 possibly fulfil a third function, namely of serving as a support for the ballast means 7.

The stabilisation and buoyancy means 6 comprise a supporting and high resistance structure 26 connected rigidly to the hull 1, as above mentioned and two floats 27. In vertical cross-section, the structure 26 has a general inverted U or pseudo U shape with an enlarged base 28 and short sides 29 diverging from each other in a downwards direction. This structure 26 is thus located on either side of the hull 1 as are the floats 27 each located at the free end part of the side 29. The structure 26 extends longitudinally essentially even with the lower section 16b of the structure 15. In its upper part, the base 28 has a general flat or pseudo flat shape, at least substantially coplanar with the upper section 16d of the structure 15. The sides 29 are preferably concave with their concave side directed towards the hull 1. The floats 27 extend the sides 29 in a downwards direction and are in the form of chambers partly or completely filled with a light filling material such as polyurethane foam. The sides 29 are directed towards the front in order to project from the plane defined by the front section 16a of the enclosure which facilitates the frontal protection function for the ballast means 7. The free lower edge 30 of each float 27 is substantially rectilinear and horizontal and located substantially midway along the windows—which does not prevent the passenger from looking horizontally or downwards. The free upper edge 31 of the floats 27 corresponds at least substantially to the upper water-line 9 (FIG. 4).

Lateral stability is thus essentially ensured by the two floats 27. As for longitudinal stability, this is ensured by the two floats 27 and a rear float 32 of solid and enlarged shape, located at the rear of the craft and thus extending the hull 1 rearwards, located between the rear section 16c and the access platform 20. This rear float 32 is also filled at least partly with a filling material such as polyurethane foam.

The ballast means 7 for varying the draught are designed so as to maintain the stability of the craft whether the latter is in its upper or lower position. These means may be static such as ballast-tanks or inflatable structures or movable such as movable floats.

In the particular embodiment illustrated in the drawings, the ballast means 7 are static and constituted by ballast tanks accommodated in the structure 26 of the means 6. This arrangement is particularly advantageous since the structure 26 necessary for forming the stabilisation and buoyancy means 6 of the catamaran type is utilized for forming the ballast means 7. All other things being equal, this results in lighter weight of the craft, a reduction in the bulk and improved aesthetic appearance. Associated with the ballast tanks are upper and lower outlet openings 33a and 33b respectively located in the upper part of the structure in the vicinity of the base 28 and in the lower part in the vicinity of the side 29, in order to facilitate the evacuation of ballast water depending on whether the craft is in the lower or upper position. A pump 34 is also provided for filling the ballast tanks, which are located in particular in the lower part of the craft, adjacent the rear section 16c, between the weight 17 and the rear float 32. The pump 34 is of the hydraulic type or any other suitable type.

In its upper part, the craft comprises a concave hood 36 which extends and connects the sides 29 in the upwards direction, thus giving this arrangement the general shape of an inverted crescent as illustrated in FIG. 4. Towards the rear, the hood 36 and the parts belonging to the structure 26 project above the access platform 20 and define protective members 37.

The propulsion means 10 comprise an engine 38 of any suitable type, in particular a diesel engine, located at any free point of the craft, in particular below the hood 36 and above the upper section 16d of the structure 15, controlling a propeller unit 39 located at the rear of the craft in order to prevent the passengers from being troubled by the wash which it produces in the water. Transmission means 40 are located between the engine 38 and the propeller unit 39. For example these are hydraulic transmission means. The propeller unit 39 is mounted on the shaft 41 having a vertical axis 42, which is mounted to pivot through 180°. Naturally, suitable means are provided for controlling the rotation of the shaft 41.

The station 11 from which the craft is steered is in the form of accommodation for a pilot located in particular in the front part of the craft above and at the front of the passenger compartment 24, in front of the engine 38. This accommodation is accessible through an opening 43 which can be closed off by a canopy 44 ensuring surface vision. Access to the opening 43 is facilitated by the presence at the front and upper part of the craft of a front platform 45.

The means 13 facilitating under-water vision may have numerous variations. In the embodiment illustrated, these means 13 are in the form of a window located in the upper part of the front section 16a of the structure 15. In particular, this window may have the same general characteristics of shape as those of the windows 5. The port-hole 13 is located in the passenger compartment 24 and thus also enables the passengers to look forwards.

In another possible embodiment, the craft comprises two windows for under-water vision, which are inclined relative to each other with respect to a vertical plane and meet in line located in this plane and inclined upwards and forwards.

Naturally, it is obvious that the embodiment which has been described is given solely by way of example and it will be understood that other constructions could be envisaged in particular as regards the hull 1, the access means 3, the windows 5, the stabilisation and buoyancy means 6, the means for varying the draught 7, the propulsion means 10, the pilot's station 11, the means 12 for surface vision and the means 13 for under-water vision. The operation of such a craft is as follows. Initially, the craft is berthed and floats at its lower water-line. The passengers may thus proceed to the access platform 20 protected by the members 37 in order to pass through the opening 19 and enter the passenger compartment 24 by the staircase or gangway 21. They may then take their places on the seats 25. As for the pilot, he enters the pilot's station 11 by way of the front platform 45 and the opening 43. Owing to the propulsion means 10, the craft is able to move horizontally and reach an area which is considered as being particularly interesting as regards the under-water environment. The craft moves with great stability owing to the presence of the stabilisation and buoyancy means 6. At any point and at any desired time, as soon as the depth of the water permits it, the pilot is able to cause his craft to float at the upper water-line in order that the passenger compartment 24 is substantially submerged, as are the observation windows 5 and in order that the passengers may observe the under-water environment at their leisure. To this end, the pilot operates the means for varying the draught 7, in particular the pump 34 associated with the ballast tanks constituting these means. At any desired point or at any desired instant, in particular when the depth of water allows it, the pilot may vary the floatation line of the craft in order to restore this temporarily to the upper water-line. Naturally, the invention may have very numerous variations.

What is claimed is:

1. A floatable, unsinkable and nautical observation craft comprising in combination a hull having a keel portion below the water line, an upper portion above the water line and longitudinal sides, separate stabilization and buoyancy means connected rigidly to the upper portion of the hull and projecting laterally from both longitudinal sides of the hull, a passenger's compartment extending longitudinally in the hull at least partially below the water line in the keel portion thereof, propulsion means at at rear of the craft, passenger access means in the upper portion of the hull, a pilot station at the front of the upper portion of the hull, said passenger compartment having at least one longitudinally extending observation window in each longitudinal side of the hull, said observation window being dome-shaped and defining a laterally projecing part of the keel portion of the hull of sufficient length that several passengers can simultaneously have an under-water view through said dome-shaped window in a substantially horizontal direction and in a downwards direction, and means providing surface vision and under-water vision for a pilot in said pilot station said stabilization and buoyancy means comprising a transversely extending high resistance supporting structure extending to both sides of the hull and extending downwardly floats at opposite sides of said supporting structure and spaced laterally from said passenger compartment.

2. A craft as claimed in claim 1, in which said observation window has the form of an ellipsoid the major axis of which is parallel to the longitudinal axis of the craft.

3. A craft as claimed in claim 1, further comprising means for varying the draught of the craft between two extreme water-lines, said lines comprising a lower line and an upper line at which said observation window is substantially below the water level.

4. A craft as claimed in claim 1, in which said stabilization and buoyancy means comprises means providing protection for the craft laterally and forwardly and shading said observation window to prevent troublesome reflections.

5. A craft as claimed in claim 1, in which said stabilization and buoyancy means comprises variable supporting means for varying the draught of the craft.

6. A craft as claimed in claim 1, in which the hull comprises a high resistance structure defining a central enclosure having a front section, a lower section, a rear section, and an upper section, a ballast weight being located in said lower section.

7. A craft as claimed in claim 1, in which said high resistance supporting structure includes a base which is substantially flat and substantially coplanar with the upper section of said high resistance structure of said hull.

8. A craft as claimed in claim 1, in which said stabilization and buoyancy means also comprise an enlarged rear float which extends the hull rearwards.

9. A craft as claimed in claim 3, in which said means for varying the draught comprise ballast means supported by said stabilization and buoyancy means, said ballast means comprising with lower and upper outlet openings and a pump.

10. A craft as claimed in claim 1, in which said upper portion of said hull comprises a hood which connects opposed sides of the craft, said hood defining a lower space for an engine supplying power for said propulsion means.

11. A craft as claimed in claim 1, in which said passenger access means are at the rear of the upper portion of the craft and include an access platform and a staircase in an opening connecting said access platform with said passenger compartment.

12. A craft as claimed in claim 1, in which said pilot station comprises a cockpit located in front of the upper portion of said hull and directly accessible from outside the craft.

13. A floatable unsinkable nautical observation craft comprising in combination a hull having a keel portion below the water line, an upper portion above the water line and longitudinal sides, separate stabilization and buoyancy means connected rigidly to the upper portion of the hull and projecting laterally from both longitudinal sides of the hull, a passenger's compartment extending longitudinally in the hull at least partially in the keel portion thereof, propulsion means at the rear of the craft, passenger access means in the upper portion of the hull, a pilot station located at the front of the upper portion of the hull, said pilot station comprising means providing surface vision and means providing underwater vision, said passenger compartment having at least one longitudinally extending observation window in each longitudinal side of the hull, said observation window being dome-shaped and defining a laterally projecting part of the keel portion of the hull of sufficient length that several passengers can simultaneously have an under-water vision through said dome-shaped window in a substantially horizontal direction and in a downwards direction said means for under-water vision comprising a front window located in a forward end of a front section of said hull at the forward end of the passenger compartment.

* * * * *